(12) United States Patent
Iwai et al.

(10) Patent No.: US 8,452,796 B2
(45) Date of Patent: May 28, 2013

(54) IMAGE PROCESSING APPARATUS, IMAGE PROCESSING METHOD, IMAGE FORMING APPARATUS AND RECORDING MEDIUM

(75) Inventors: Hidetaka Iwai, Itami (JP); Kazuo Inui, Itami (JP); Nobuhiro Mishima, Osaka (JP); Kaitaku Ozawa, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 254 days.

(21) Appl. No.: 12/821,527

(22) Filed: Jun. 23, 2010

(65) Prior Publication Data
US 2010/0332464 A1 Dec. 30, 2010

(30) Foreign Application Priority Data
Jun. 26, 2009 (JP) ................................ 2009-152565

(51) Int. Cl.
*G06F 7/00* (2006.01)
(52) U.S. Cl.
USPC ........................................................ 707/767
(58) Field of Classification Search
USPC ................................................. 707/706, 767
See application file for complete search history.

(56) References Cited

U.S. PATENT DOCUMENTS

| | | | |
|---|---|---|---|
| 7,644,101 B2 | 1/2010 | Yano | |
| 2002/0029232 A1* | 3/2002 | Bobrow et al. | 707/517 |
| 2003/0014441 A1 | 1/2003 | Suzuki et al. | |
| 2008/0147643 A1 | 6/2008 | Takahashi | |

FOREIGN PATENT DOCUMENTS

| | | |
|---|---|---|
| JP | 2000-276471 | 10/2000 |
| JP | 2003-099302 | 4/2003 |
| JP | 2004-046478 | 2/2004 |
| JP | 2005-346309 | 12/2005 |
| JP | 2006-003999 | 1/2006 |
| JP | 2007-102767 A | 4/2007 |
| JP | 2008-152370 | 7/2008 |
| JP | 2009-080806 | 4/2009 |

OTHER PUBLICATIONS

E. Taki, "To Perfectly Master PowerPoint 2003", The First Issue, (2004), pp. 682-688 and a partial English Translation.
Office Action (Notification of Reasons for Refusal) dated Mar. 15, 2011, issued in the corresponding Japanese Patent Application No. 2009-152565, and an English Translation thereof.

* cited by examiner

*Primary Examiner* — Truong Vo
(74) *Attorney, Agent, or Firm* — Buchanan Ingersoll & Rooney PC

(57) ABSTRACT

A search site on a network performs information search by a keyword. When a Web page is selected among those detected by the information search, the text in the selected Web page and the Web page's address are interconnected and recorded as one search record in a recording device. And then, it is judged whether or not there exist in one or more then one document, any words that match any keywords included in the search records recorded in the recording device. If there exists a word that matches a keyword, the display data to display the document with just a part of the text as least and/or the Web page's address included in the same search record as the keyword, is created, and a job is executed using the display data.

14 Claims, 10 Drawing Sheets

FIG. 5

Please drag a preferable text and record by pressing the "record in a search record" key What PCI Express is: - IT Terminology Dictionary - Microso...

File(F) Edit(E) View(V) Favorites(A) Tool(T) Help(H)

Address(D) http://www.sophia-it.com/content/PCI+Express

PCI Express is an interface standard for connection between chipsets or for universal enhanced I/O. While in development, PCI Express was initially referred to as HSI (for High Speed Interconnect), and underwent a name change to 3GIO (for 3rd Generation I/O) before finally setting on its PCI-SIG name PCI Express. It was first drawn up by a technical working group named the Arapaho Work Group(AWG) which for initial drafts consisted of an Intel only team of architects. Subsequently the AWG was expanded to include industry partners.

PCI Express is a technology under constant development and improvement. In 2004, Intel introduced PCIe 1.0, with a data rate of 250 MB/s and a transfer rate of 2.5 GT/s. Later, version 1.1 offered minor revisions to the specification. On 15 January 2007, the PCI-SIG announced the availability of the PCI Express Base 2.0 specification. This doubled data rate of each lane from 250 to 500, and the transfer rate from 2.5 GT/s to 5 GT/s. PCIe 2.0 is backward compatible with PCIe 1.1 as a physical interface slot and from within software, so olded cards will still be able to work in machines fitted with PCIe 2.0. The proposed PCIe 3.0 is scheduled for release around 2010.

○ Internet

Back to Top

Record in a Search Record — 191b

191a

191

| No | Search Date | Search Time | Keyword | Searched Information (text) | URL |
|---|---|---|---|---|---|
| 1 | 2008/8/25 | 14:23 | PCI Express | an interface standard for connection between chipsets or for universal enhanced I/O. While in development, PCI Express was initially referred to as HSI (for High Speed Interconnect), and underwent a name change to 3GIO (for 3rd Generation I/O) before finally setting on its PCI-SIG name PCI Express. It was first drawn up by a technical working group named the Arapaho Work Group (AWG) which for initial drafts consisted of an Intel only team of architects. Subsequently the AWG was expanded to include industry partners. | http://www.sophia-it.com/conect/PCI+Express |
| .. | .. | .. | .. | .. | .. |
| 14 | 2008/8/29 | 15:41 | Advanced Switch Interconnect | a combination of the existing semiconductor's advanced technology and the industry standard technology and the construction method developed by ACI SIG. | http://www.incom.co.jp/newsroom/desc.php/87 |
| .. | .. | .. | .. | .. | .. |
| 32 | 2008/9/10 | 16:10 | Flow Control | function to control data communication, for example stop data transmission or limit the speed of data transmission depending on the communication state, in order to prevent data missing due to over capacity of the data receiver device. | http://ew.hitachi-system.co.jp/w/E38395E383ADE383BCE588B6E5BEA1.html |

Matching Setting: Please set conditions for information search

Search Reccords: Keyword
- [✓] The latest　　　　　　　　　　10 records
- [ ] The oldest　　　　　　　　　　× × × record(s)
- [ ] 2008/09/22～2008/06/22　　× × × record(s)

Document: Word
- [✓] Number of the Word in the Document: 2

Set　　Cancel

FIG.9

IMAGE PROCESSING APPARATUS, IMAGE PROCESSING METHOD, IMAGE FORMING APPARATUS AND RECORDING MEDIUM

This application claims priority under 35 U.S.C. §119 to Japanese Patent Application No. 2009-152565 filed on Jun. 26, 2009, the entire disclosure of which is incorporated herein by reference in its entirety.

BACKGROUND OF THE INVENTION

1. Field of the Invention

The present invention relates to an image processing apparatus such as a MFP (Multi Function Peripheral) that is a copier, a printer or a multifunctional digital machine collectively having the copy function, the print function, the scan function and other functions; an image processing method implemented by the image processing apparatus; an image forming apparatus; and a computer readable recording medium having a program recorded therein to make a computer execute processing.

2. Description of the Related Art

The following description sets forth the inventor's knowledge of related art and problems therein and should not be construed as an admission of knowledge in the prior art.

There exist some image processing apparatuses such as MFPs like that described above, having a Web browser that is software to view Web pages on the Internet, and such image processing apparatuses are configured to allow users to access a search site on a network using the Web browser and search information by a keyword.

For example, when a user views a document recorded in such an image processing apparatus and finds an unclear word in the document, the user can search the meaning of the word using a search site on a network, using the Web browser.

In many cases, users tend to easily forget the meaning of a word even though they have previously searched and learnt it. Thus, everytime a user finds an unclear word in a document, he/she practically has to search the meaning of the word by transmitting a keyword to a search site, even if he/she has previously searched and learnt it, which makes user operation troublesome and inefficient.

As disclosed in Japanese Unexamined Laid-open Patent Publication No. 2007-102767, there exists an information processing apparatus that is capable of suggesting referential documents helpful for understanding the currently viewed document. While a user is viewing a document, the information processing apparatus records as one record of context metadata, a connection between the currently viewed document and referential documents and a connection between a keyword used for information search and the referential documents that the user has previously viewed among those detected by the keyword. And then, when the user views this document again, the image processing apparatus facilitates this user's understanding the document, by analyzing the record of context metadata and providing a list of the documents that the user have previously viewed.

Meanwhile, as disclosed in Japanese Unexamined Laid-open Patent Publication No. 2007-102767, there exists an information processing apparatus that provides a list of available documents about one document, but does not facilitate a user's knowing the meaning of a word in a document having been previously viewed. And this image processing apparatus provides a different list of available documents about a different document. And thus, this technology cannot resolve the conventionally existing inconvenience described above, that everytime a user finds an unclear word in a document, he/she has to search the meaning of the word using a search site, even if he/she has previously searched and learned the meaning.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that facilitates a user's knowing the meaning of a word in a document even without performing information search using a search site, only if the user has previously searched the meaning.

It is an object of the present invention to provide an image processing method that facilitates a user's knowing the meaning of a word in a document even without performing information search using a search site, only if the user has previously searched the meaning.

It is an object of the present invention to provide an image forming apparatus that facilitates a user's knowing the meaning of a word in a document even without performing information search using a search site, only if the user has previously searched the meaning.

It is an object of the present invention to provide a computer readable recording medium having an image processing program recorded therein to make a computer of an image processing apparatus implement an image processing method that facilitates a user's knowing the meaning of a word in a document even without searching via a search site, if the user has previously searched.

According to a first aspect of the present invention, an image processing apparatus includes:

a transmitter that transmits a keyword for information search to a search site on a network, using a Web browser;

a search record memory that records in itself, the keyword, a text specified among those in the Web pages detected by the search site, and the address of the Web page having the specified text, with a connection to each other, as one search record;

a word detection judger that judges whether or not there exists in one or more than one document to be processed according to a job, a word that matches a keyword included in the search records recorded in the search record memory;

a display data creator that creates the display data to display the document with just a part of the text at least and/or the Web page's address included in the same search record as the keyword, if the word detection judger judges that there exists in the document, a word that matches the keyword; and a job executor that executes the job using the display data created by the display data creator.

According to a second aspect of the present invention, an image processing method includes:

transmitting a keyword for information search to a search site on a network, using a Web browser;

recording in a search record memory, the keyword, a text specified among those in the Web pages detected by the search site, and the address of the Web page having the specified text, with a connection to each other, as one search record;

judging whether or not there exists in one or more than one document to be processed according to a job, a word that matches a keyword included in the search records recorded in the search record memory;

creating the display data to display the document with just a part of the text and/or the Web page's address included in the same record as the keyword, if it is judged that there exists in the document, a word that matches the keyword; and executing the job using the created display data.

According to a third aspect of the present invention, an image forming apparatus includes:

a transmitter that transmits a keyword for information search to a search site on a network, using a Web browser;

a search record memory that records in itself, the keyword, a text specified among those in the Web pages detected by the search site, with a connection to each other, as one search record;

a word detection judger that judges whether or not there exists in one or more than one document to be processed according to a job, a word that matches a keyword included in the search records recorded in the search record memory;

a display data creator that creates the display data to display the document with just a part of the text at least and/or the Web page's address, if the word detection judger judges that there exists in the document a word that matches the keyword; a job executor that executes a job, using the display data created by the display data creator; and a scanner that reads an image on a paper document, and wherein:

the word detection judger judges whether or not there exists in a document that is image data obtained by the scanner from the paper document, a word that matches a keyword included in the search records.

According to a fourth aspect of the present invention, a computer readable recording medium has an image processing program recorded therein to make a computer of an image processing apparatus execute:

transmitting a keyword for information search to a search site on a network, using a Web browser;

recording in a search record memory, the keyword, a text specified among those in the Web pages detected by the search site, and the address of the Web page having the specified text, with a connection to each other, as one search record;

judging whether or not there exists in one or more than one document to be processed according to a job, a word that matches a keyword included in the search records recorded in the search record memory;

creating the display data to display the document with just a part of the text and/or the Web page's address included in the same record as the keyword, if it is judged that there exists in the document, a word that matches the keyword; and executing the job using the created display data.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 5 is a view showing a selected Web page displayed in a screen on a display of an operation panel, which is received from a Website, so that a user could select to record in a search record;

FIG. 6 is a view showing an example of a search record recorded in a recording medium;

FIG. 9 is a view showing a setting screen for a user or another person to set a keyword by which the meaning of a word in a document is searched, and a condition about a word for document word detection;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
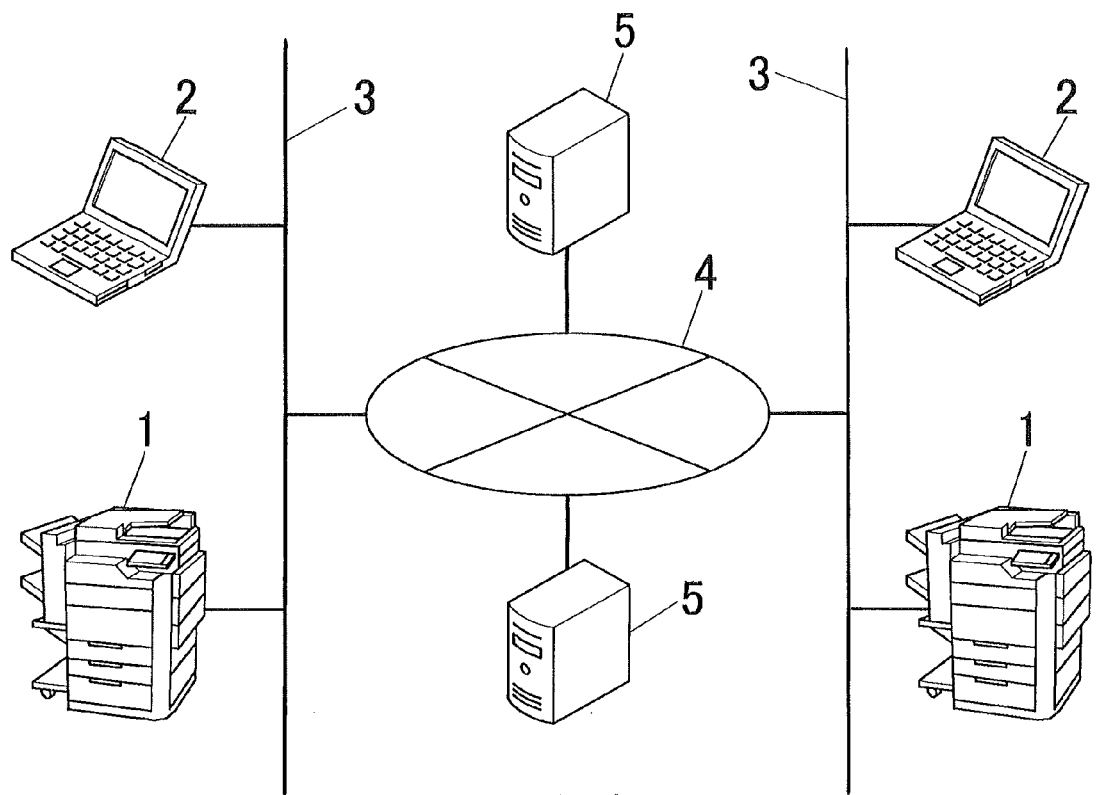
FIG. 1 is a view showing a configuration of a network system in which an image processing apparatus according to one embodiment of the present invention is employed.

FIG. 1 is a view showing a configuration of a network system in which an image processing apparatus according to one embodiment of the present invention is employed.

In this image processing system of FIG. 1, a plurality of image processing apparatuses 1, and a plurality of terminal apparatuses 2 serving as external devices that are personal computers, are connected to a plurality of Web search sites 5, via a LAN (Local Area Network) 3 employing Ethernet (registered trademark) and the Internet 4.

In this embodiment, a MFP that is a multifunctional digital image forming apparatus like that described above, is employed as the image processing apparatus 1. Hereinafter, the image processing apparatus 1 also will be referred to as "MFP 1".

Figure 2:
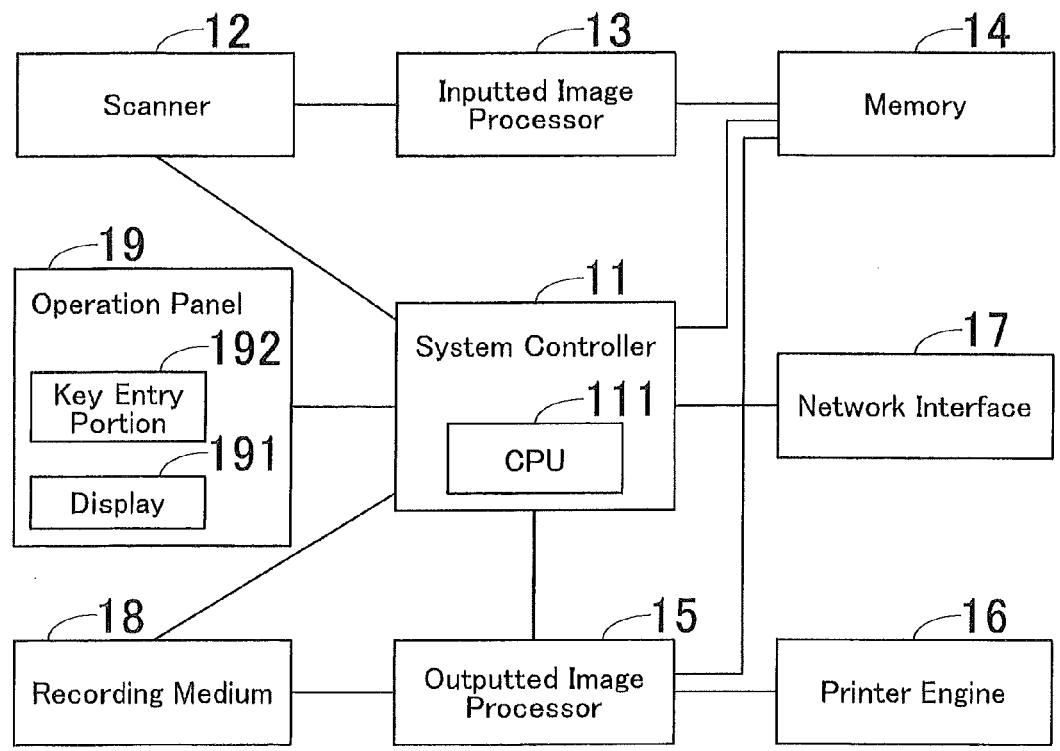
FIG. 2 is a block diagram schematically showing a configuration of the MFP 1.

FIG. 2 is a block diagram schematically showing a configuration of the MFP 1.

The MFP 1 includes a system controller 11, a scanner 12, an inputted image processor 13, a memory 14, an outputted image processor 15, a printer engine 16, a network interface 17, a recording medium 18, an operation panel 19 and etc.

The system controller 11 includes a CPU 111. The CPU 111 centrally controls the entire MFP 1 by executing processing according to an operation program recorded in the recording medium 18 and another memory, and the CPU 111 is connected to each of the components of the MFP 1. Also in this embodiment, the system controller 11 further makes the MFP 1 work as a Web server for the terminal apparatus 2.

The scanner 12 reads a document placed on a document table (not shown in Figure) and outputs image data obtained therefrom, which is electronic data.

The inputted image processor 13 performs processing in a predetermined manner on the image data received from the scanner 12. The memory 14 records in itself the image data received from the scanner 12. The outputted image processor 15 creates print data based on the image data processed by the inputted image processor 13.

The printer engine 16 prints out the image data read out from a document by the scanner 12, the print data received from the terminal apparatus 2, and other data.

The network interface 17 functions as a communicator that exchanges data with the terminal apparatus 2 and the search site 5, via the LAN 3 and the Internet 4.

The recording medium 18 is a recording medium such as a hard disk drive, and records in itself an operation program for the CPU 111, various application software and various data. Also in this embodiment, the recording medium 18 further records a Web browser that is Web page viewer software so that users could access Web pages on the Internet via the network interface 17, using this Web browser.

Furthermore, the recording medium 18 has one or more then one memory area, and one or more than one document to be processed according to a job is recorded in each memory area before execution of the job. Some Boxes are private Boxes that are individually provided for users, some Boxes are group Boxes that are individually owned by groups, and some Boxes are public Boxes that do not limit accesses from any users.

The operation panel 19 includes a display 191 that is a liquid crystal display that displays on itself an operating state of the MFP 1, a mode setting screen, a message, a Web page on the Internet and other information, and a key entry portion 192 having a numeric key pad, a start key, a stop key and other keys.

The MFP 1 has the function of holding and administering workflows. A workflow is composed of a series of processes to be cooperatively executed by a plurality of devices connected to the network 3, which are specified in advance. Workflows are recorded in the recording medium 18 so that they could be reused later.

Hereinafter, a procedure executed in the MFP 1 employed in the image processing system of FIG. 1, will be explained.

Initially, the procedure to access a Web search site and perform information search by a keyword, executed in the MFP 1, will be explained with reference to a flowchart shown in FIG. 3. In this example, the MFP 1 serves as a Web server to perform information search, and a user who owns the terminal apparatus 2 gives to the MFP 1, an instruction to transmit a keyword, by operating the terminal apparatus 2.

The procedure of the MFP 1 is executed by the CPU 111 of the system controller 11, according to an operation program recorded in the recording medium 18 or another memory.

Initially, the terminal apparatus 2 recognizes the MFP 1 as a Web server and transmits thereto a request to perform information search by a keyword using a Web search site 5 (Step S01).

The MFP 1 transfers to the Web search site 5, the keyword by which information search is requested by the terminal apparatus 2 and records the keyword in itself (Step S11).

The Web search site 5 performs information search by the keyword (Step S21) and returns a search result to the MFP 1 (Step S22).

The MFP 1 transfers to the terminal apparatus 2, the search result received from the Web search site 5 (Step S12).

The terminal apparatus 2 displays on itself a list of the detected Web pages based on the search result (Step S02). The user who owns the terminal apparatus 2 selects a preferable Web page from the list, and the terminal apparatus 2 transmits to the MFP 1a request to display the selected Web page (hereinafter also will be referred to as "selected Web page") (Step S03).

The MFP 1 transfers to the Web site, the request received from the terminal apparatus 2 and records in itself a URL (Uniform Resource Locator) that is the address of the selected Web page (Step S13).

In response to the request to display the selected Web page, received from the MFP 1, the Web site returns the selected Web page to the MFP 1 (Step S23).

The MFP 1 transfers to the terminal apparatus 2 the selected Web page received from the Web site, and reads out a text from a specified area of the selected Web page and records the text in itself (Step S14). And the "keyword", "text" and "URL" recorded therein are connected together, and recorded in the recording medium 18 as one search record (Step S15). The area of the selected Web page may be specified by the predetermined number of lines existing from the top of Web page or the predetermined number of characters existing from the top of the Web page.

The terminal apparatus 2 displays on itself the selected Web page received from the MFP 1 (Step S04).

Figure 3:
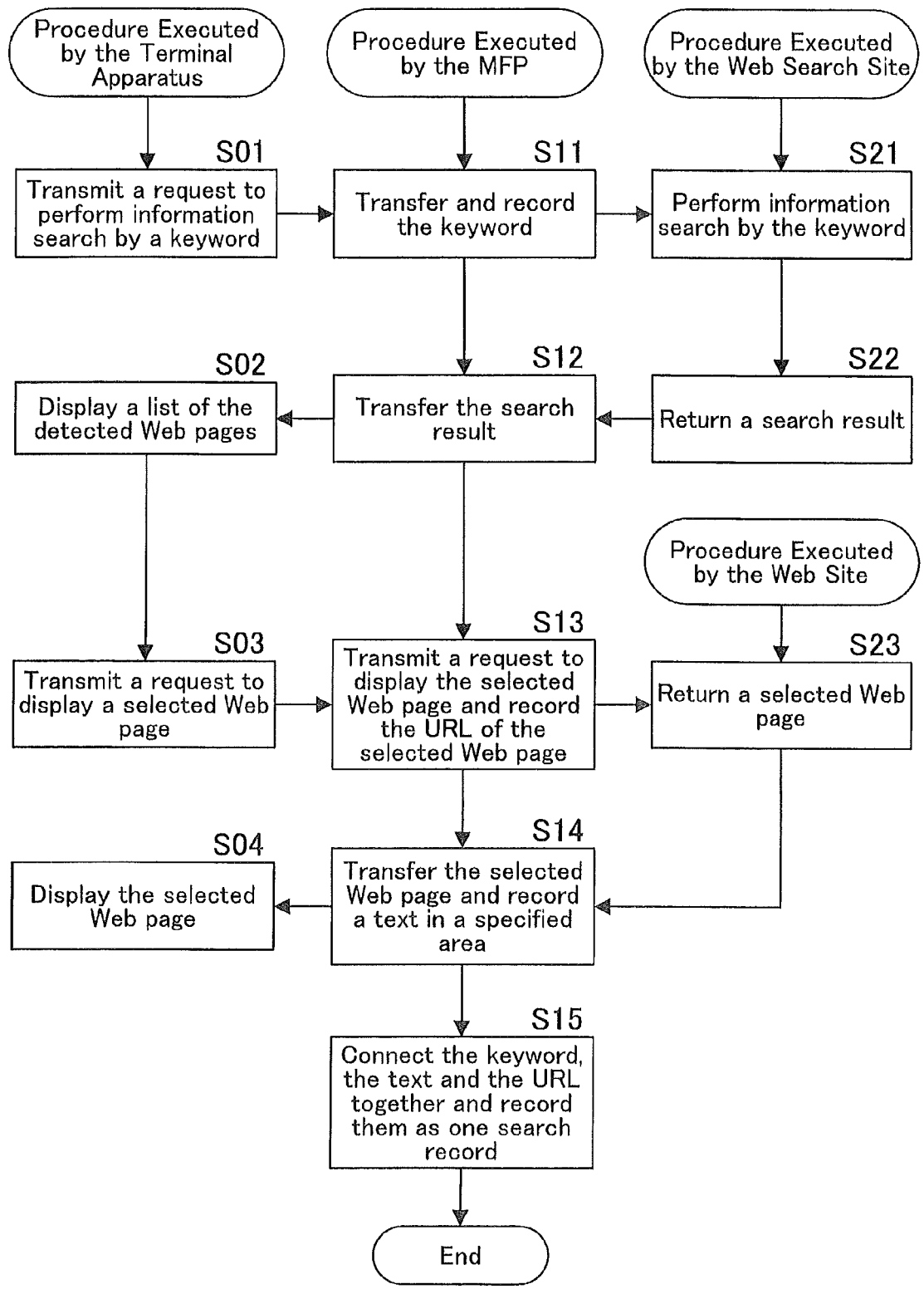
FIG. 3 is a flowchart representing a procedure executed in the image processing apparatus to access a Web search site and search information by a keyword.

In this example shown in FIG. 3, the MFP 1 serves as a Web server, and performs information search in response to a search request from the terminal apparatus 2. Alternatively, a user may give to the MFP 1, an instruction to perform information search by a keyword and specify an area of a document to record in a search record, by directly operating the MFP 1.

Figure 4:
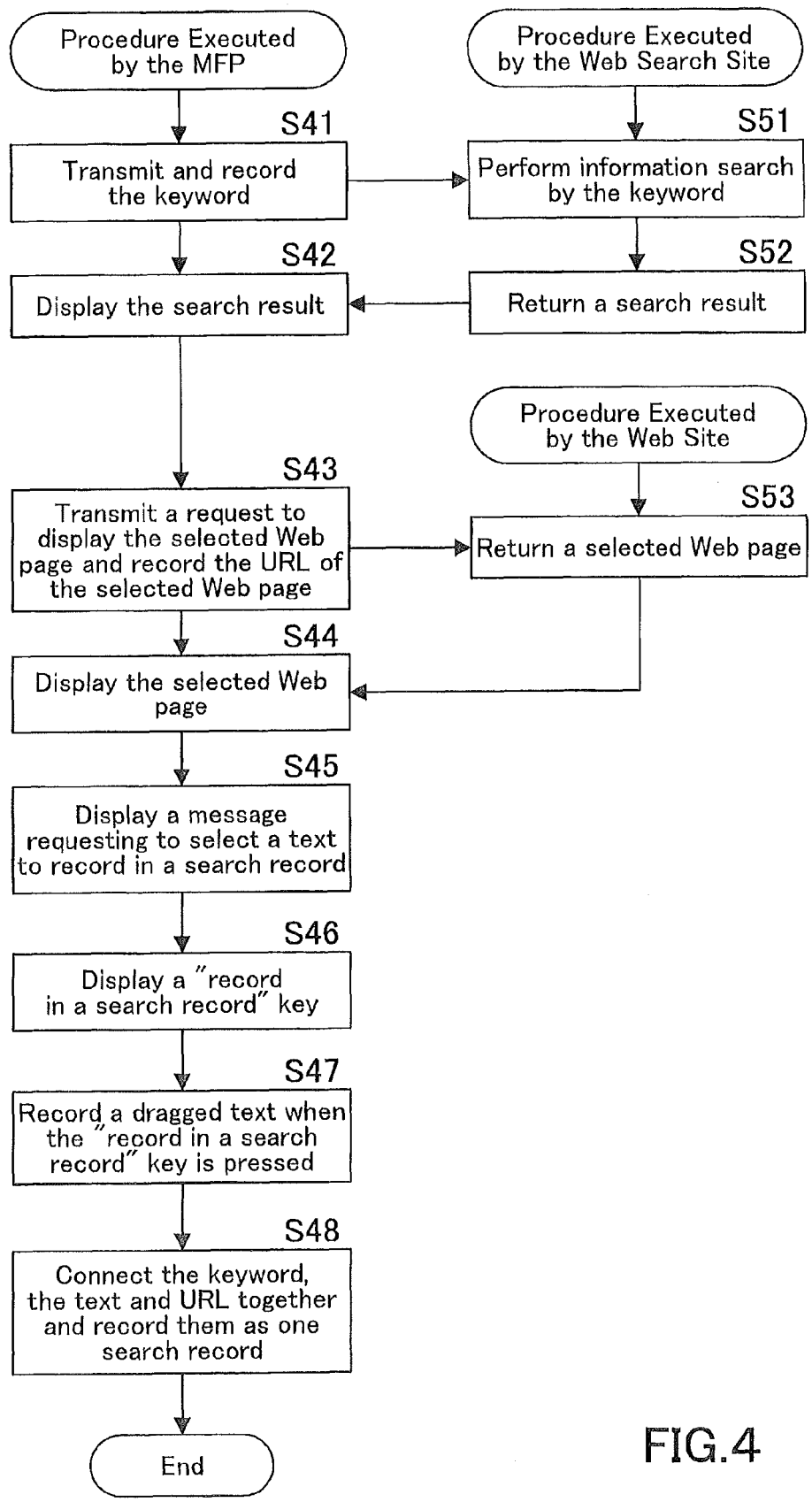
FIG. 4 is a flowchart representing a procedure executed in the image processing apparatus when a user performs information search by a keyword, operating the image processing apparatus.

A procedure executed when a user gives an instruction to perform information search by a keyword, by operating the MFP 1, will be explained with reference to a flowchart shown in FIG. 4. This procedure is executed by the CPU 111 of the system controller 11, according to an operation program recorded in the recording medium 18 or another memory.

Initially, the MFP 1 transmits to the Web search site 5, a keyword for information search, entered by the user, and records the keyword in itself (Step S41).

The Web search site 5 performs information search by the keyword (Step S51) and returns a search result to the MFP 1 (Step S52).

The MFP 1 displays on the display 191, a list of the detected Web pages based on the search result (step S42). The user selects a preferable Web page from the list, and the MFP 1 transmits to the Web site, a request to display the selected Web page and records in itself the URL of the selected Web page (Step S43).

In response to the request to display the selected Web page, received from the MFP 1, the Web site returns the selected Web page to the MFP 1 (Step S53).

And as shown in FIG. 5, the MFP 1 displays on the display 191: the selected Web page received from the Web site; a message 191*a* that requests the user to select a text to record in a search record (Step S45); and a "record in a search record" button 191*b* (Step S46).

The user drags a text and presses the "record in a search record" button 191*b*, then the dragged text is recorded (Step S47). And also, the keyword used for information search, the dragged text and the URL are connected together and recorded as one search record (Step S48). In FIG. 5, the dragged text is marked with shading.

FIG. 6 is a view showing an example of the search records recorded in the recording medium 18. In this example, one search record includes a "keyword", "text" and "URL" as described above, and also a search date and a search time. In FIG. 6, the search record of No. 1 was recorded when the user dragged a text to record, via the screen shown in FIG. 5, and the record includes the following information:

Keyword Used for Information Search: PCI Express,
Recorded Text: "the connection between the chipsets . . . is known under the name . . . "; and
Recorded URL: http://www.sophia-it.com/content/PCI+ Express.

As shown in FIG. 6, the search record of No. 14 and the search record of No. 23 include a text within the predetermined number of lines existing from the top of the Web page or within the predetermined number of characters existing from the top of the Web page.

Each of the search records may be recorded with a connection to the user who created the record, or may be recorded without such a connection. Alternatively, as to be described later, each of the search records recorded therein may be used only by the user who created the record or may be used by all users without limitation of users, or alternatively, whether only by the user who created the record or by all users may be selected.

Figure 7:
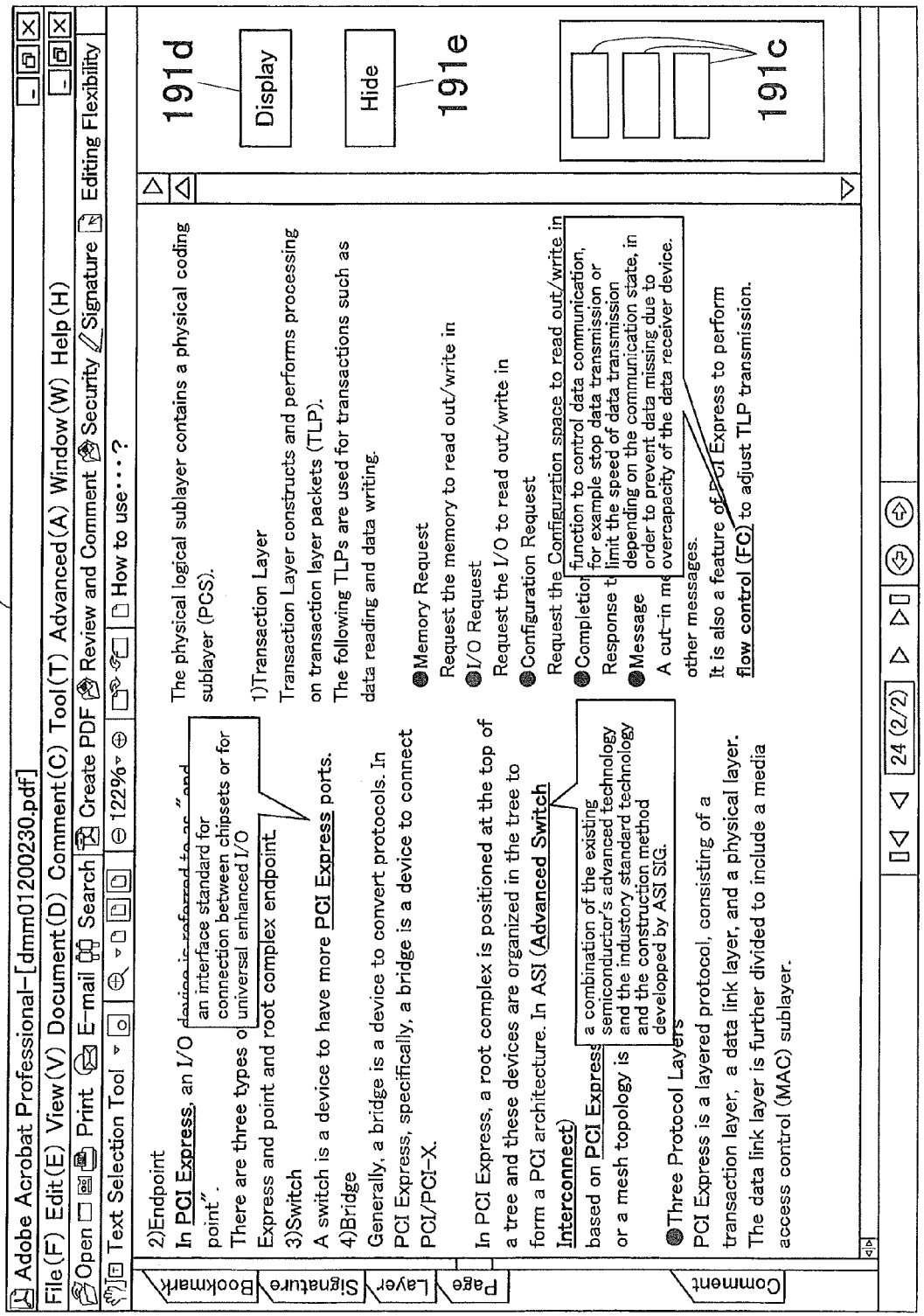
FIG. 7 is a view showing a document displayed in a screen with the meanings of words therein, based on the search records recorded in the image processing apparatus.

FIG. 7 is a view showing a screen in which a document or etc. recorded in the MFP 1, is displayed with the meanings of words in the document, based on the search records recorded in the MFP 1.

A user opens a document by operating the MFP 1, and if there exist in the document, any words that match keywords in the search records, the MFP 1 displays the matching words highlighted with underlines or etc. and further displays in balloons, the texts that indicate the meanings of the keywords, recorded in the search records in the recording medium 18 with a connection to the keywords, as shown in FIG. 7.

These operations are performed using display data created by the MFP 1. For example, if a document to be processed according to a job is a searchable PDF (Portable Document Format) file, the MFP 1 creates a layer (hereinafter also will be referred to as "meaning layer") that carries underlines, texts in balloons and etc., and further creates the display data to display the document with underlines, texts in balloons and etc., by merging this meaning layer to the document.

In stead of texts, the MFP 1 may display linked locations that are the addresses in the search records.

Alternatively, the MFP 1 may create the display data to display the words that matches the keywords, with linked locations that are the addresses in the search records.

The MFP 1 may create the display data to display the matching words highlighted, and make a text or address included in the same search record as a pressed word, displayed when a user selects the word by a cursor or etc.

The MFP 1 may create the display data to display list keys 191*c* representing the matching words as shown in FIG. 7, and make a text or address included in the same search record as a pressed list key 191*c*, displayed when a user presses the key.

In this embodiment, a display key 191*d* and a hide key 191*e* are displayed. When a user presses the display button 191*d*, the document display mode is employed as shown in FIG. 7, and thus the document is displayed with the texts or addresses included in the same search records as the matching words. Meanwhile, when a user presses the hide button 191*e*, the document hide mode is employed, and thus the document is displayed without the texts or addresses included in the search records.

Hereinafter, a procedure executed in the MFP 1 when a user gives to the MFP 1 an instruction to execute a job, will be explained with reference to a flowchart shown in FIG. 8. This procedure is executed by the CPU 111 of the system controller 11, according to an operation program recorded in the recording medium 18 or another memory.

In Step S61, it is judged whether or not an instruction to execute a job is given. A user may give this instruction by directly operating the MFP 1 or by remotely operating the MFP 1 from the terminal apparatus 2. If no such instruction is given (NO in Step S61), then it is judged in Step S62, whether or not there exists any document that is a searchable PDF file including no meaning layer to be merged and displayed with the document, in a Box that is a memory area of the recording medium 18.

If no such document exists (NO in Step S62), the routine immediately terminates without proceeding anymore. If such a document exists (YES in Step S62), then it is judged in Step S63, whether or not there exist any search records in the recording medium 18.

If no search record exists (NO in Step S63), the routine immediately terminates. If any search records exist (YES in Step S63), then in Step S64, it is judged whether or not any words in the document match any keywords included in the existing search records, and a meaning layer is created and recorded with a connection to the document.

In Step S61, if an instruction to execute a job is given (YES in Step S61), then it is judged in Step S65, whether or not the document to be processed according to the job is a searchable PDF file, or alternatively, it is judged in Step S65, whether or not the job is to convert the document to a searchable PDF file (for example, the job is to convert to a searchable PDF file, the document that is image data read out from a document by the scanner 12).

If the document to be processed according to the job is not a searchable PDF file, or alternatively, the job is not to convert the document to a searchable PDF file (NO in Step S65), the routine proceeds to Step S72, in which the job is executed in an ordinary manner.

If the document to be processed according to the job is a searchable PDF file, or alternatively, the job is to convert the document to a searchable PDF file (YES in Step S65), then it is judged in Step S66, whether or not there exist any search records in the recording medium 18.

If no search record exists (NO in Step S66), the job is executed in an ordinary manner in Step S72. If any search records exist (YES in Step S66), then it is judged in Step S67, whether or not the document to be processed according to the job includes a meaning layer. If the document includes a meaning layer (YES in Step S67), the routine proceeds to Step S71, in which the job is executed.

If the document does not include a meaning layer (NO in Step S67), then it is judged in Step S68, whether or not the job has large time restriction.

In this embodiment, whether small or large time restriction is set in advance depending on the job type. Meanwhile, no time restriction is set to the following jobs:
- A job to preview a document in a Box;
- A job to transmit a document in a Box to the user's terminal apparatus 2; and
- A job to view or download a document in a Box remotely from the user's terminal apparatus 2.

Small time restriction is set in advance to the following jobs, in other words, a few seconds or even a few dozen seconds would not be very stressful to complete execution of the following jobs:
- A job to transmit a document scanned by the scanner 12 to the user's terminal apparatus 2; and
- A job to transmit a document to another user via the MFP 1.

Large time restriction is set in advance to the following job, in other words, even a few seconds would be stressful to complete execution of the following job:
- A job to preview a document scanned by the scanner 12.

In Step S68, if the job has small or no time restriction (NO in Step S68), then in Step S69, it is judged whether or not any words in the document match any keywords included in the existing search records, and a meaning layer is created. And then, the document and the meaning layer are merged into display data and the display data is outputted, in Step S71. In other words, if the job is to preview a document on the display 191 of the operation panel 19 of the MFP 1, the display data is outputted on the display 191. If the job is to transmit a document to the terminal apparatus 2, the display data is transmitted to the terminal apparatus 2.

If the job has large time restriction (YES in Step S68), then in Step S70, it is judged whether or not any words in the document match only some of the keywords included in the existing search records and a meaning layer is created. And then, the document and the meaning layer are merged into display data and the display data is outputted, in Step S71.

In this embodiment, users or other persons can set in advance, conditions about a keyword for document word detection and a word.

As shown in FIG. 9, users enter conditions via a setting screen displayed on the display 191 of the MFP 1.

Users can enter a temporal condition and a numeric condition about a keyword for document word detection, via the setting screen shown in FIG. 9. Whether "the latest record(s)" or "the oldest record(s)" may be set as a temporal condition, or a period of time may be set as a temporal condition. And the frequency of use may be set as a condition about a word for document word detection. In the example of FIG. 9, it is judged there exist among the words having been used more than twice in a document, any words that match any keywords included in the latest ten search records.

By pressing a set button in FIG. 9, the entered conditions are determined. By pressing a cancel button, the entered conditions are canceled.

As described above, users can set conditions about a keyword for document word detection and a word. Thus, their intention can be reflected to document word detection.

Figure 8:
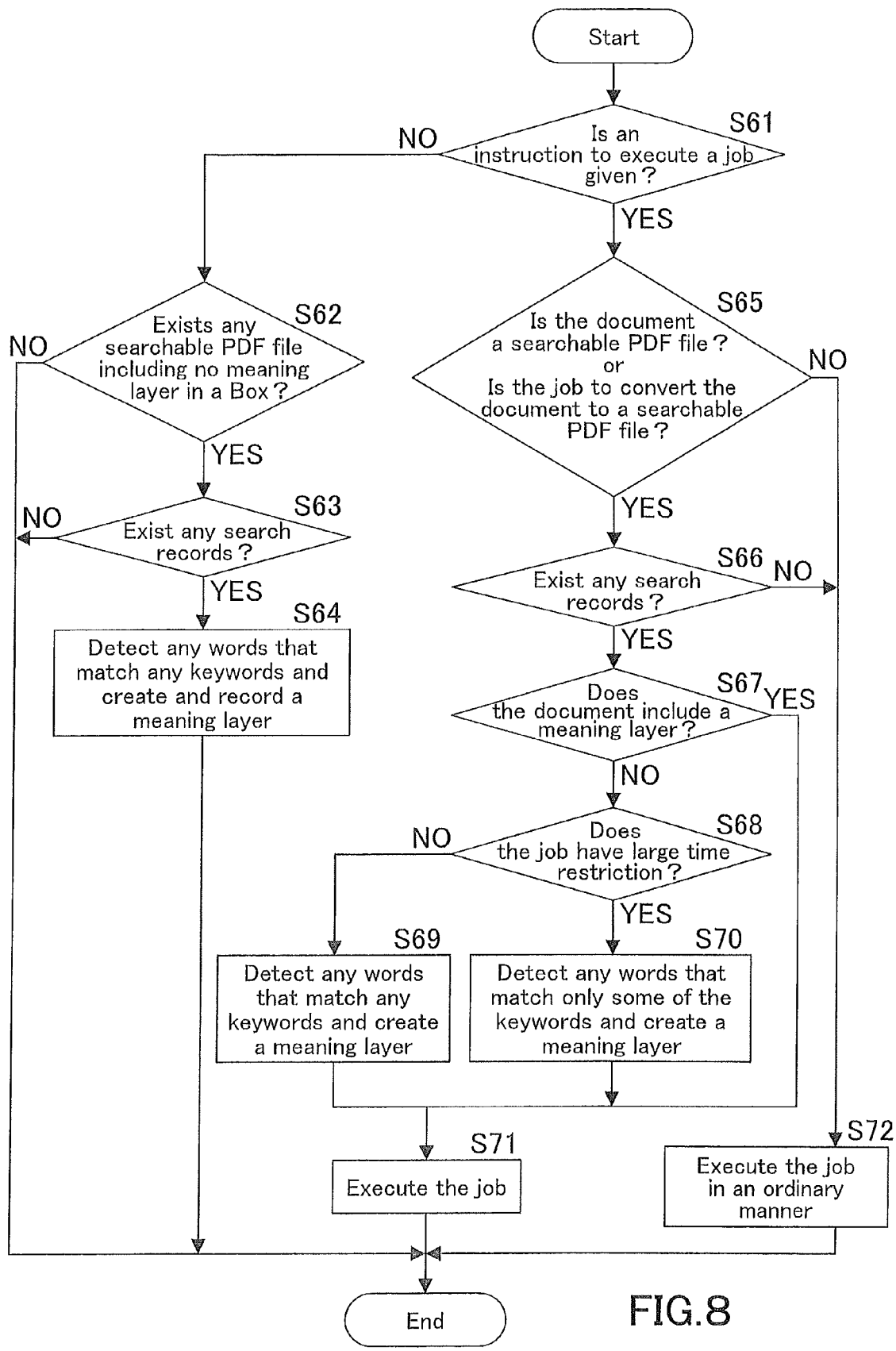
FIG. 8 is a flowchart representing a procedure executed in the image processing apparatus when the user gives an instruction to execute a job to the image processing apparatus.

In an embodiment shown in FIG. 8, a user who gives an instruction to execute a job on a document or a user who operates the terminal apparatus 2 that received a document, views the document that is displayed with texts or etc. that indicate the meanings of predetermined words in the document. This is effective and convenient for the user since the user can easily know the meanings of the words even without performing information search using a search site on a network. Furthermore, any documents can be displayed with texts or etc. that indicate the meanings of words, not depending on the document type. That would eliminate the inconveniences that a different type of document cannot be displayed with texts or etc. that indicate the meanings of words.

In this embodiment of FIG. 8, a document is displayed with texts that indicate the meanings of words or addresses of the Web pages where the texts exist, if the document is a searchable PDF file. However, the format or style of a document to be displayed with texts or addresses is not limited to the searchable PDF. And meanwhile, the image processing apparatus may be configured to detect words only from the documents recorded in a predetermined Box or folder and display the documents with texts or etc. that indicate the meanings of the detected words.

Figure 10:
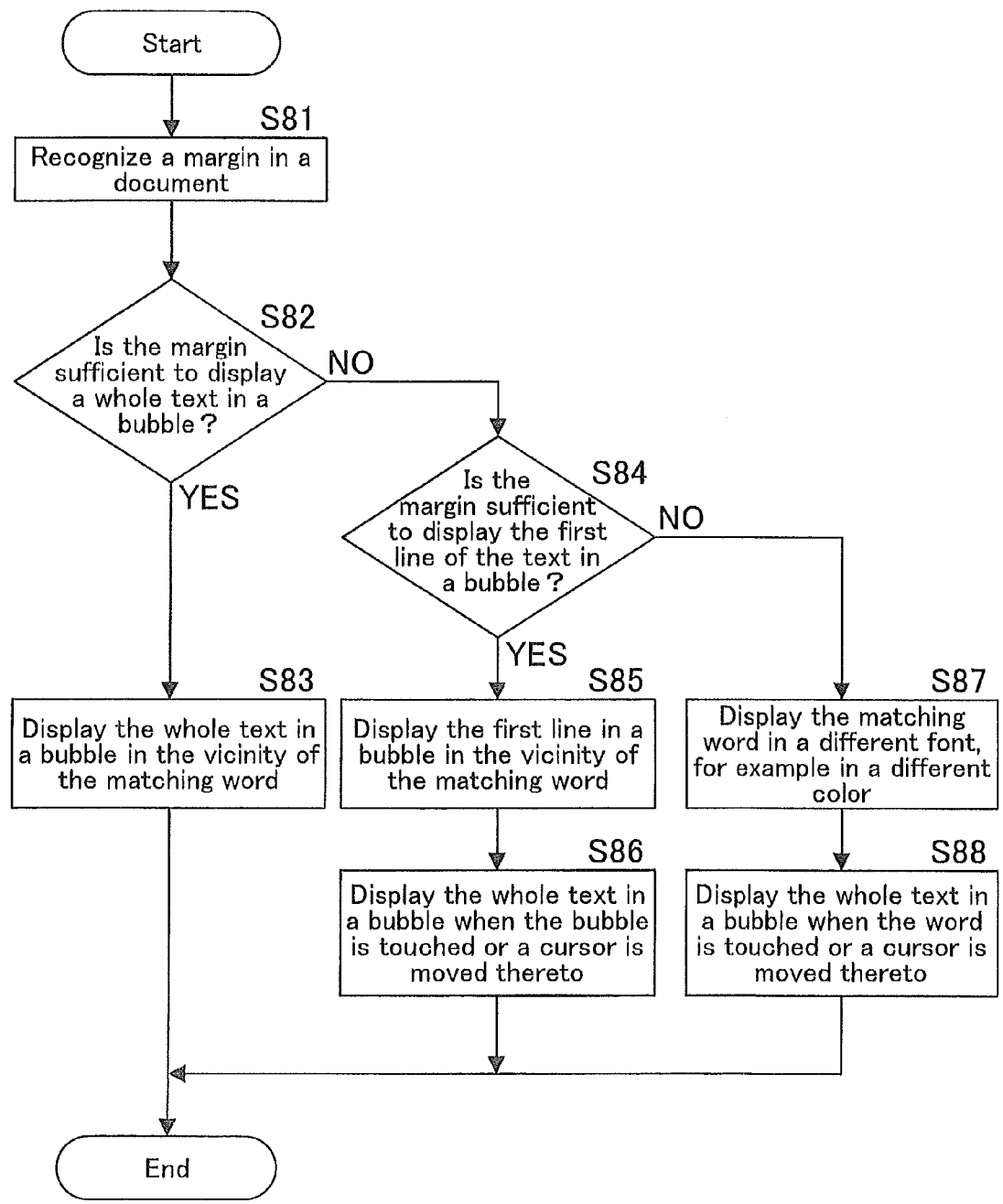
FIG. 10 is a flowchart representing a procedure executed in the image processing apparatus in another embodiment of the present invention.

The FIG. 10 relates to another embodiment of the present invention, showing a flowchart representing a procedure executed in the MFP 1.

In this embodiment, the image processing system is configured to switch between the display styles to display texts or etc. that indicate the meanings of words, based on the size of a margin in a document. This procedure is also executed by the CPU 111 of the system controller 11, according to an operation program recorded in the recording medium 18 or another memory.

In Step S81, a margin in a document, which is in the vicinity of a word that matches a keyword, is recognized. Then it is judged in Step S82, whether or not the margin is sufficient to display in a bubble, a whole text that indicates the meaning of the word. If it is sufficient (YES in Step S82), a whole text that indicates the meaning thereof is displayed in a bubble in the vicinity of the matching word, in Step S83. If the margin is not sufficient (NO in Step S82), the routine proceeds to Step S84.

In Step S84, it is judged whether or not the margin is sufficient to display the first line of the text in a bubble. If the margin is sufficient (YES in Step S84), the first line of the text is displayed in a bubble in the vicinity of the matching word, in Step S85. When the bubble is touched or a cursor is moved to the bubble, the whole text is displayed in the bubble in Step S86.

In Step S84, if the margin is not sufficient to display the first line of the text in a bubble (NO in Step S84), the matching word is displayed in a different font, for example in a different color, in Step S87. After that, when the matching word is touched or a cursor is moved to the matching word, the whole text is displayed in a bubble in Step S88.

As described above, display data suitable for a margin in a document is created, in other words, the display data to display a document in a more understandable style for users, is created based on the size of a margin in a document.

Figure 11:
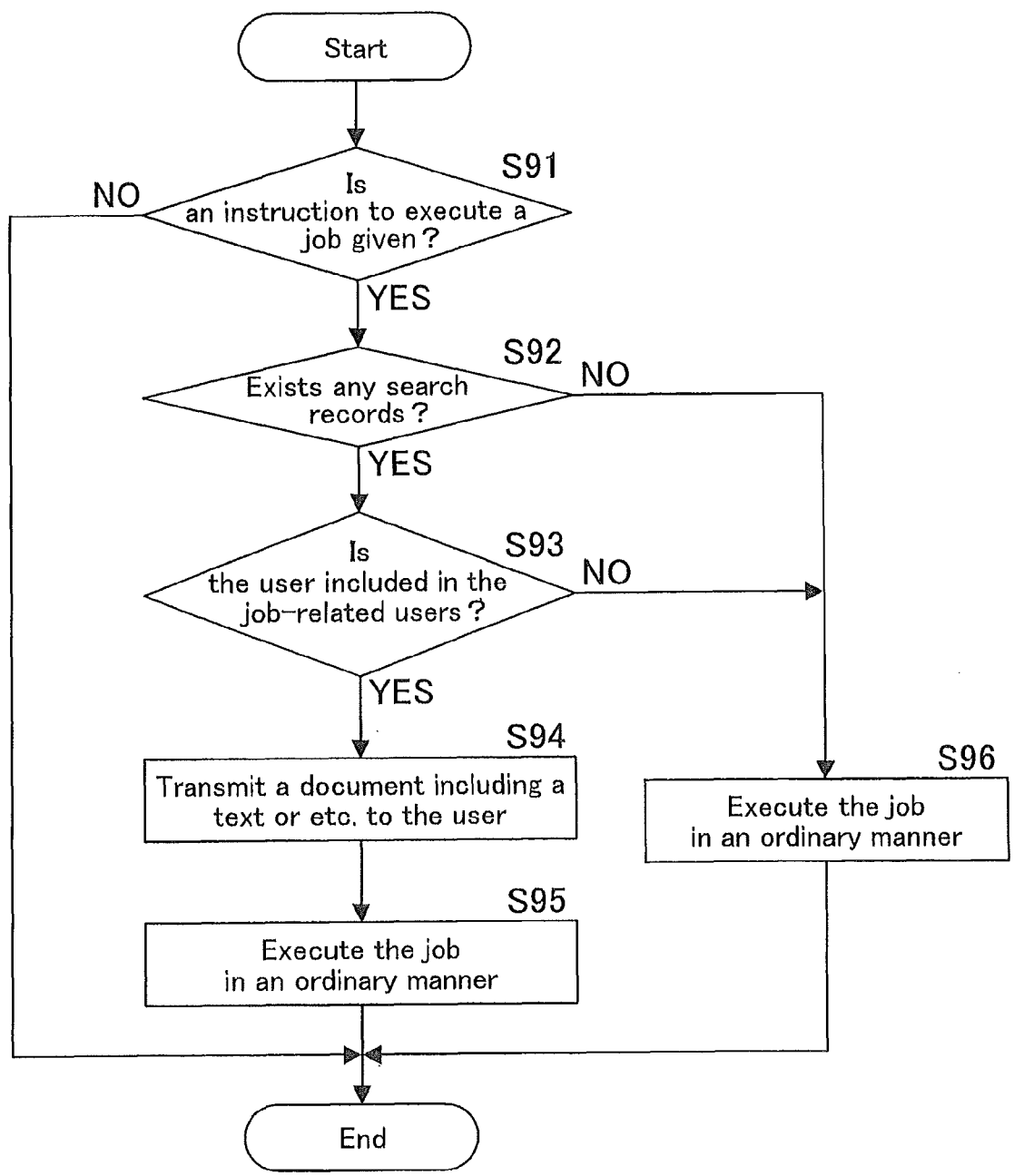
FIG. 11 is a flowchart representing a procedure executed in the image processing apparatus in yet another embodiment of the present invention.

FIG. 11 relates to yet another embodiment of the present invention, showing a flowchart representing a procedure executed in the MFP 1.

In this embodiment, it is judged whether or not a job should be executed on a document, using display data created by the MFP 1, based on the job type. And if it is judged that a job should be executed, the job is executed using the display data.

For example, this embodiment can be applied to the case where a user would like to display a material document recorded in a Box of the MFP 1 both on a projector and the user's terminal apparatus 2 by communicating via a network, for making a presentation. In this embodiment, the projector and the terminal apparatus 2 display the document by synchronization, specifically the projector displays only the document without texts or etc. that indicate the meanings of words, meanwhile the terminal apparatus 2 displays the document with texts or etc. that indicate the meanings of words.

This embodiment also can be applied to the case where a user would like to transmit a document that is image data obtained by the scanner 12, to a plurality of addresses including this user's address. In this embodiment, only the document is transmitted to the addresses excluding this user's address, meanwhile the display data to display the document with texts that indicate the meanings of words, is transmitted to this user's address.

In this case, if the addresses include this user's address, the MFP 1 transmits the display data only to this user's address, which is configured in advance. It is judged whether or not the addresses include this user's address, based on information of the user identified by user authentication when the user logged in the MFP 1, each user's address information recorded in advance in the recording medium 18, and address information entered by the user.

The procedure of FIG. 11 is also executed by the CPU 111 of the system controller 11, according to an operation program recorded in the recording medium 18.

In Step S91, it is judged whether or not an instruction to execute a job is given. A user may give this instruction by directly operating the MFP 1 or by remotely operating the MFP 1 from the terminal apparatus 2. If no such instruction is given (NO in Step S91), the routine immediately terminates.

If such an instruction is given (YES in Step S91), then it is judged in Step S92, whether or not there exist any search records in the recording medium 18.

If no search record exists (NO in Step S92), the job is executed in an ordinary manner in Step S96. If any search records exist (YES in Step S92), then it is judged in Step S93, whether or not the user is included in the job-related users.

If the user is not included in the job-related users (NO in Step S93), the routine proceeds to Step S96, in which the job is executed in an ordinary manner, since it is necessary to transmit only a document. If the user is included in the job-related users (YES in Step S93), the display data to display the document with embedded texts or etc. that indicate the meanings of words, is created and transmitted to this user's address, in Step S94. After that, the document is transmitted to the addresses other than this user's address, in an ordinary manner.

Each of these described above is one embodiment of the present invention, but the present invention is not limited to these embodiments. For example, in these embodiments, a MFP that is a multifunctional image forming apparatus is employed as the image processing apparatus. However, the present invention may be applied to an image forming apparatus that is a simple copier or printer.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a transmitter that transmits a keyword for an information search to a search site on a network, using a Web browser;
   a search record memory device that records in itself, the keyword, a text providing a meaning of the keyword selected from at least one Web page detected by the search site, and an address of the Web page having the text, with a connection to each other, as one search record;
   a word detection judger that judges whether there exists, in a document to be processed according to a job, a word that matches the keyword included in the search records recorded in the search record memory device by comparing words included in the document to be processed with keywords included in the search records recorded in the search record memory device;
   a display data creator that creates display data to display the document overlapped with at least a portion of the text included in the same search record as the keyword and/or the address of the Web page included in the same search record as the keyword, when the word detection judger judges that there exists in the document, a word that matches the keyword; and
   a job executor that executes the job using the display data created by the display data creator.

2. The image processing apparatus recited in claim 1, further comprising:
   a text range specifier that specifies the text among those in the Web pages included in the search records recorded in the search record memory device.

3. The image processing apparatus recited in claim 2, wherein:
   the text range specifier specifies the text by a drag operation of a user, by the predetermined number of lines existing from a top of the document, or by the predetermined number of characters existing from the top of the document.

4. The image processing apparatus recited in claim 1, wherein:
the transmission of the keyword for information search to the search site by the transmitter is performed according to an instruction from an external device using the image processing apparatus as a Web server.

5. The image processing apparatus recited in claim 1, wherein:
the word detection judger decides whether or not to perform the judgment operation or changes the judgment operation, depending on a condition to execute a job on the document.

6. The image processing apparatus recited in claim 5, wherein:
the word detection judger decides to perform the judgment operation, if it is a job to convert the document into a searchable PDF or it is a job to process the document that is a searchable PDF file.

7. The image processing apparatus recited in claim 5, wherein:
the word detection judger judges whether or not there exists in the document, a word that matches any keyword, by comparing the word to each of the keywords included in the search records, if the job has small or no time restriction, meanwhile the word detection judger judges whether or not there exists in the document, a word that matches any keyword, by comparing the word to each keyword that is selected among those included in the search records, if the job has large time restriction.

8. The image processing apparatus recited in claim 1, further comprising:
a document memory,
and wherein:
if the document to be processed according to a job is recorded in advance in the document memory, the word detection judger judges whether or not there exists in each document recorded in the document memory, a word that matches any keyword, by comparing the word to each of the keywords included in the search records.

9. The image processing apparatus recited in claim 1, wherein:
the display data creator creates:
the data having a word that matches the keyword, with an embedded linked location that is an address included in the search record;
the data to merge a layer showing a text or address included in the search record to a document and selectively display or hide the text or address in a bubble coming up from the matching word;
the data to decorate the matching word and display a text or address included in the search record when the decorated word is selected; or
the data to display words that matches the keyword in a list and display in a window a text or address related to a word from the search record when the word is selected among the list,
as display data.

10. The image processing apparatus recited in claim 1, wherein:
the display data creator creates suitable display data for a margin in the document.

11. The image processing apparatus recited in claim 1, further comprising:

a judger judges whether or not the job executor should execute the job using the display data created by the display data creator, depending on the type of the job.

12. An image forming apparatus comprising:
a transmitter that transmits a keyword for information search to a search site on a network, using a Web browser;
a search record memory device that records in itself, the keyword, a text providing a meaning of the keyword selected from at least one Web page detected by the search site, with a connection to each other, as one search record;
a word detection judger that judges whether there exists, in a document to be processed according to a job, a word that matches the keyword included in the search records recorded in the search record memory device by comparing words included in the document to be processed with keywords included in the search records recorded in the search record memory device;
a display data creator that creates display data to display the document overlapped with at least a portion of the text included in the same record as the keyword, when the word detection judger judges that there exists in the document a word that matches the keyword;
a job executor that executes a job, using the display data created by the display data creator; and
a scanner that reads an image on a paper document, and wherein:
the word detection judger judges whether or not there exists in a document that is image data obtained by the scanner from the paper document, a word that matches a keyword included in the search records.

13. An image processing method implemented by an image processing apparatus comprising:
transmitting a keyword for information search to a search site on a network, using a Web browser;
recording in a search record memory, the keyword, a text providing a meaning of the keyword selected from at least one Web page detected by the search site, and an address of the Web page having the text, with a connection to each other, as one search record;
judging whether there exists, in a document to be processed according to a job, a word that matches the keyword included in the search records recorded in the search record memory by comparing words included in the document to be processed with keywords included in the search records recorded in the search record memory device;
creating display data to display the document overlapped with at least a portion of the text included in the same search record as the keyword and/or the address of the Web page included in the same record as the keyword, when it is judged that there exists in the document, a word that matches the keyword; and
executing the job using the created display data.

14. A computer readable recording medium having an image processing program recorded therein to make a computer of an image processing apparatus execute:
transmitting a keyword for information search to a search site on a network, using a Web browser;
recording in a search record memory, the keyword, a text providing a meaning of the keyword selected from at least one Web page detected by the search site, and an address of the Web page having the text, with a connection to each other, as one search record;
judging whether there exists, in a document to be processed according to a job, a word that matches the keyword included in the search records recorded in the search record memory by comparing words included in the document to be processed with keywords included in the search records recorded in the search record memory device;
creating display data to display the document overlapped with at least a portion of the text included in the same search record as the keyword and/or the address of the Web page included in the same record as the keyword, when it is judged that there exists in the document, a word that matches the keyword; and
executing the job using the created display data.

* * * * *